(12) United States Patent
Hirano

(10) Patent No.: US 11,487,235 B2
(45) Date of Patent: Nov. 1, 2022

(54) PRINTER SYSTEM SWITCHING A CONNECTION FOR SUPPLY OF AC VOLTAGE TO A VOLTAGE SOURCE

(71) Applicant: CANON KABUSHIKI KAISHA, Tokyo (JP)

(72) Inventor: Yuya Hirano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/218,226

(22) Filed: Mar. 31, 2021

(65) Prior Publication Data

US 2021/0325812 A1    Oct. 21, 2021

(30) Foreign Application Priority Data

Apr. 20, 2020  (JP) .............................. JP2020-074875

(51) Int. Cl.
*G03G 15/00*  (2006.01)
*H02M 3/04*   (2006.01)
*H02M 7/04*   (2006.01)

(52) U.S. Cl.
CPC ............... *G03G 15/80* (2013.01); *H02M 3/04* (2013.01); *H02M 7/04* (2013.01)

(58) Field of Classification Search
USPC .......................................................... 399/88
See application file for complete search history.

(56) References Cited

U.S. PATENT DOCUMENTS

| 10,536,085 | B2 | 1/2020 | Hirano |
| 2016/0261762 | A1 | 9/2016 | Ito |
| 2020/0183484 | A1 | 6/2020 | Hirano |

FOREIGN PATENT DOCUMENTS

| CN | 105282921 A | * | 1/2016 | ........... B60Q 1/1423 |
| JP | 6414490 B2 | | 10/2018 | |
| JP | 2018195142 A | * | 12/2018 | ......... G03G 15/5004 |

* cited by examiner

*Primary Examiner* — Quana Grainger
(74) *Attorney, Agent, or Firm* — Venable LLP

(57) ABSTRACT

A printer system includes a first apparatus including a first voltage source for converting an inputted AC voltage to a first DC voltage and for outputting the converted first DC voltage, and a first controller operable by a voltage based on the first DC voltage outputted from the first voltage source; and a second apparatus including a second voltage source for converting an inputted AC voltage to a second DC voltage and for outputting the converted second DC voltage, and a second controller operable by a voltage based on the first DC voltage outputted from the first voltage source. The second apparatus includes a first switching portion for switching a state thereof between a connection state in which the AC voltage is supplied to the second voltage source and a non-connection state in which supply of the AC voltage is cut off.

9 Claims, 4 Drawing Sheets

PRINTER SYSTEM SWITCHING A CONNECTION FOR SUPPLY OF AC VOLTAGE TO A VOLTAGE SOURCE

FIELD OF THE INVENTION AND RELATED ART

The present invention relates to a printer system and an apparatus operable in connection to the printer. Particularly, the present invention relates to a technique in which electric power consumption during an operation in an electric power saving mode is reduced in the printer system comprising an option apparatus including an AC/DC converter and an image forming apparatus.

In the printer system comprising the option apparatus including the AC/DC converter for converting an AC voltage to a DC voltage and the image forming apparatus to which the option apparatus is connected, a function of the electric power saving mode in which electric power consumed is reduced is mounted in some instances. For example, when the printer system operates in the electric power saving mode, a switching operation of the AC/DC converter of the option apparatus (hereinafter, this converter is referred to as an option voltage source) is stopped. A method in which the electric power consumption of the printer system is reduced by this has been proposed (Japanese Patent No. 6414490).

However, even when the switching operation of the option voltage source is stopped, there is a problem such that electric power is consumed at a switching controller of the option voltage source or the like even during stand-by.

SUMMARY OF THE INVENTION

According to an aspect of the present invention, there is provided a printer system comprising: a first apparatus including a first voltage source configured to convert an inputted AC voltage to a first DC voltage and configured to output the converted first DC voltage, and a first controller operable by a voltage based on the first DC voltage outputted from the first voltage source; and a second apparatus including a second voltage source configured to convert an inputted AC voltage to a second DC voltage and configured to output the converted second DC voltage, and a second controller operable by a voltage based on the first DC voltage outputted from the first voltage source, wherein the second apparatus includes a first switching portion configured to switch a state thereof between a connection state in which the AC voltage is supplied to the second voltage source and a non-connection state in which supply of the AC voltage is cut off.

Further features of the present invention will become apparent from the following description of exemplary embodiments with reference to the attached drawings.

DESCRIPTION OF THE EMBODIMENTS

Figure 1:
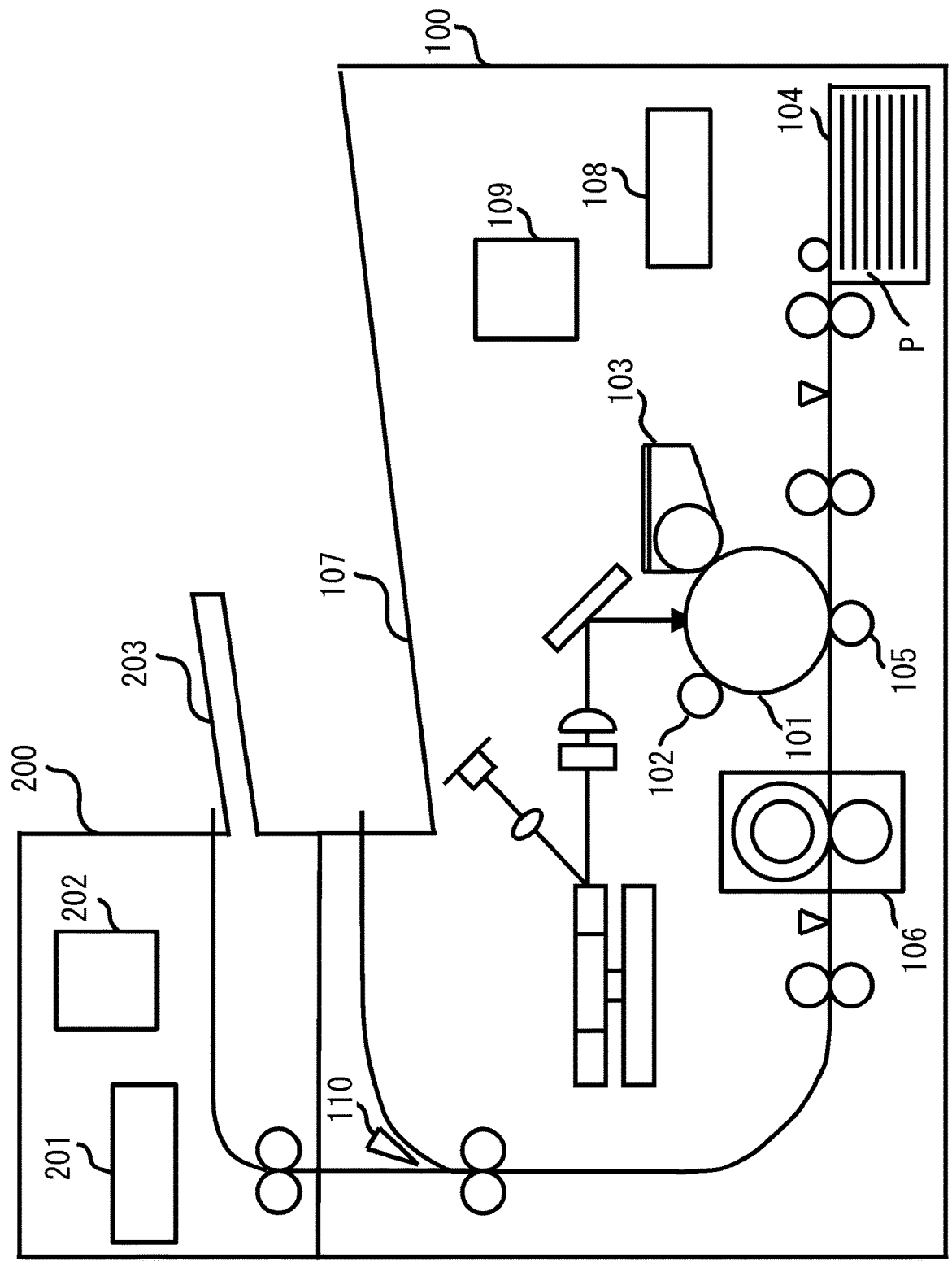
FIG. 1 is a schematic sectional view showing structures of an image forming apparatus and an option apparatus in embodiments 1 and 2.

In the following, embodiments of the present invention will be described while making reference to the drawings.

[Printer System]

In embodiment 1, an example of general structures of an image forming apparatus and an option apparatus which constitute a printer system is shown. A laser beam printer 100 includes a photosensitive drum 101, a charging portion 102 and a developing portion 103. The photosensitive drum 101 is an image bearing member on which an electrostatic latent image is formed. The charging portion 102 electrically charges the photosensitive drum 101 uniformly. The developing portion 103 develops the electrostatic latent image, formed on the photosensitive drum 101 into a toner image with toner, so that the toner is formed. The toner image formed on the photosensitive drum 101 (image bearing member) is transferred by a transfer portion 105 onto a sheet P which is a recording material supplied from a cassette 104, and then the (unfixed) toner image transferred on the sheet P is fixed by a fixing device 106. The photosensitive drum 101, the charging portion 102, the developing portion 103 and the transfer portion 105 constitute an image forming portion. The sheet P on which the toner image is fixed is fed to either one of a tray 107 and a discharging option apparatus 200 (hereinafter referred to as an option 200) by a flapper 110 for switching a discharge destination. Further, the printer 100 includes a power supply unit 108, and the power supply unit 108 supplies electric power to a controller 109 provided in the printer 100 and a controller 202 which is provided in the option 200 and which is described later. The controller 109 includes a CPU (not shown) and controls an image forming operation by the image forming portion, a feeding operation of the sheet P, and the like operation.

The option 200 is connected to the printer 100 and discharges the sheet P, fed from the printer 100, onto a tray 203. Further, the option 200 includes a power supply unit 201 and the controller 202. The power supply unit 201 supplies electric power to a driving portion such as a motor provided inside the option 200. The controller 202 includes a CPU (not shown) and controls a feeding operation of the sheet P inside the option 200 or the like operation. Further, the controller 109 of the printer 100 and the controller 202 of the option 200 control the feeding operation of the sheet P in interrelation with each other. Incidentally, the image forming apparatus to which the option apparatus in the embodiment 1 is applicable is not limited to the structure shown in FIG. 1, but may also be a color image forming apparatus including a plurality of image forming portions, for example.

[Circuit Structure]

Figure 2:
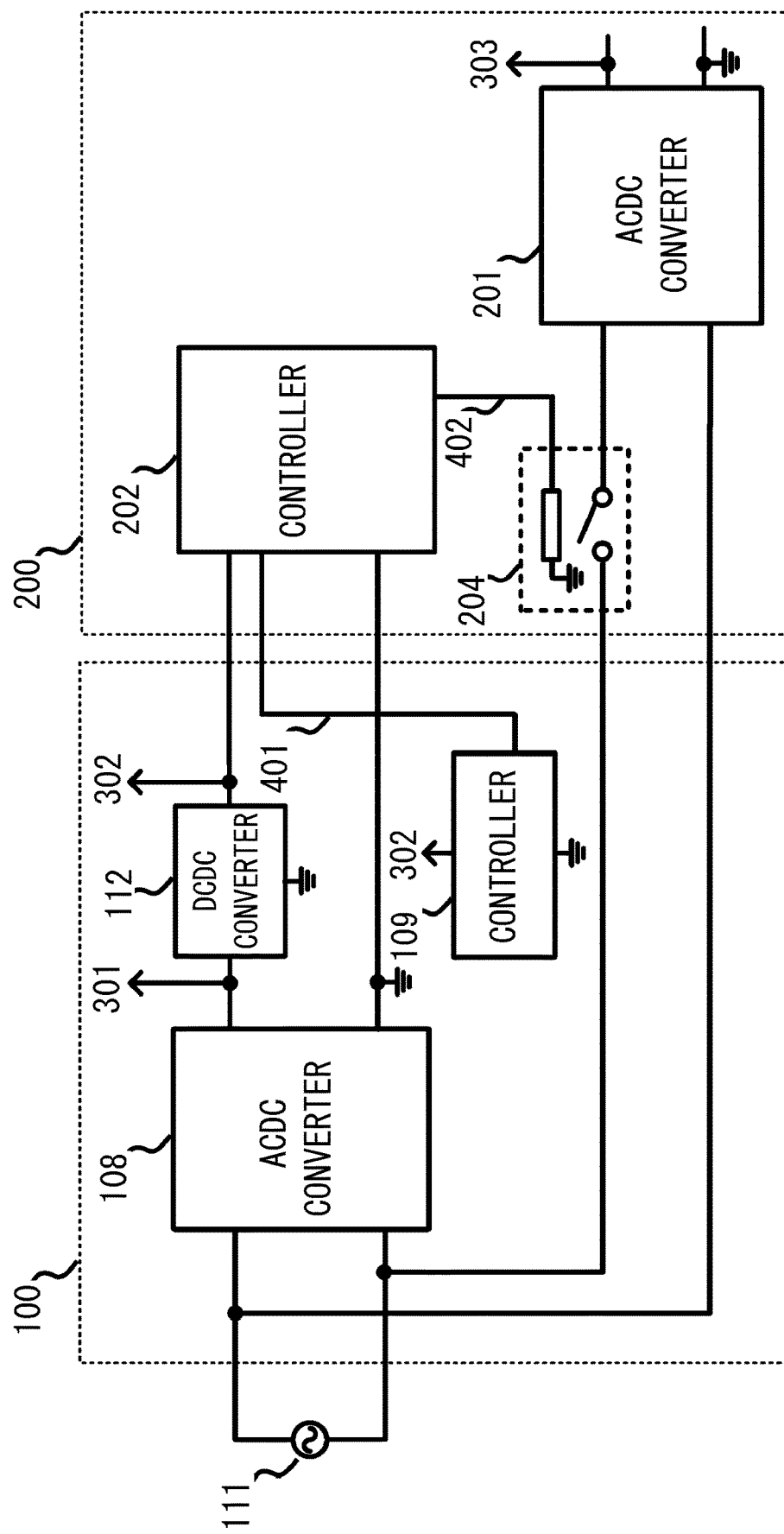
FIG. 2 is a circuit structure diagram of a printer 100 and an option 200 in the embodiment 1.

In FIG. 2, a circuit structure diagram showing the printer 100 which is a first apparatus and the option 200 which is a second apparatus is shown. An AC voltage inputted from an AC voltage source 111 is inputted to the power supply unit 108 of the printer 100 and the option 200. The power supply unit 108 which is a first voltage source is an ACDC (AC/DC) converter and converts the inputted AC voltage to a first DC voltage 301. The power supply unit 108 includes a switch element (not shown) for performing a switching operation and a voltage source control IC (not shown) for controlling the switching operation, and the like. The DC voltage 301 is not only supplied to a driving portion such as a motor of the printer 100 but also supplied to a DCDC (DC/DC) converter 112. The DCDC converter 112 which is a third voltage source is a step-down DCDC converter, and converts the inputted DC voltage 301 to a third DC voltage 302 which is a voltage lower than the DC voltage 301. The DC voltage 302 is not only supplied to the controller 109 which is a first control means but also supplied to a controller 202 which is a second control means for the option 200. The controller 109 carries out communication with the controller 202 via a single line 401.

The AC voltage inputted to the option 200 is connected to a power supply unit 201 via a relay 204 which is a first switching means. The relay 204 is an electromagnetic relay, for example. The controller 202 sends a signal to the relay 204 via a signal line 402 and controls a conduction state (connection state) or a non-conduction state (non-connection state) of the relay 204. In the case where the relay 204 is in the conduction state, the AC voltage is inputted to the power supply unit 201. The power supply unit 201 which is a second voltage source in an ACDC converter and converts the inputted AC voltage to a second DC voltage 303. The power supply unit 201 includes a switching element (not shown) for performing a switching operation and a voltage source control IC (not shown) for controlling the switching operation, and the like. The DC voltage 303 is supplied to a driving portion such as a motor provided inside the option 200.

The printer 100 and the option 200 are operable in three modes. The three modes are consisting of a printing mode which is a first mode for executing a printing operation, a stand-by mode for stand-by in a state in which the printing operation can be executed immediately, and an electric power saving mode which is a second mode in which the printer 100 or the option 200 stands by in a state in which electric power consumption is low. The controller 109 and the controller 202 change the modes of the printer 100 and the option 200 to associated modes, respectively, on the basis of states of the printer 100 and the option 200 or an instruction from a user, or the like.

(Printing Mode and Stand-by Mode)

In the case where the printer 100 receives a printing instruction from the user, the controller 109 not only switch the mode of the printer 100 to the printing mode but also sends (notifies) the printing instruction to the controller 202 via the signal line 401. When the controller 202 receives the printing instruction, the controller 202 changes the mode of the option 200 to the printing mode. When a predetermined time has elapsed from an end of the printing operation, the controller 109 and the controller 202 change the modes of the printer 100 and the option 200 to the stand-by modes. In a state in which there is no printing instruction after transition to the stand-by modes, when a predetermined time has further elapsed, the controller 109 and the controller 202 operate in the following manner. That is, in the case where the controller 109 and the controller 202 checked states of the printer 100 and the option 200, respectively, and discriminated that no error occur and that their modes are capable of being changed to the electric power saving modes.

(Electric Power Saving Mode)

When the controller 109 changes the mode of the printer 100 to the electric power saving mode, the controller 109 cuts off the DC voltage 301, supplied to the driving portion such as the motor of the printer 100, by a load switch (not shown), and thus reduces electric power consumed by the printer 100. When the controller 202 changes the mode of the option 200 to the electric power saving mode the controller 202 switches the state of the relay 204 to the non-conduction state via the signal line 402. Here, in the case where the relay 204 is in the non-conduction state even when a switching operation of the power supply unit 201 is stopped, in a control circuit such as the voltage source control IC for controlling the switching operation of the power supply unit 201, electric power is continuously consumed. In the following, the electric power consumed during the operation in the electric power saving mode is referred to as electric power during stand-by. For that reason, when the mode of the option 200 is changed to the electric power saving mode, the relay 204 is put in the non-conduction state, so that supply itself of the AC voltage to the power supply unit 201 is cut off. By this, it is possible to reduce electric power consumption which includes the electric power during stand-by generating in the power supply unit 201 and which generates on a load side than the relay 204. Incidentally, when the mode of the option 200 is restored from the electric power saving mode to the printing mode or the stand-by mode, the controller 202 switches the state of the relay 204 to the conduction state via the signal line 402, and thus restores electric power supply from the AC voltage source 111 to the power supply unit 201.

As described above, according to the embodiment 1, by putting the relay 204 in the non-conduction state during the operation in the electric power saving mode and thus by reducing the electric power consumption generating on the load side than the relay 204, it is possible to reduce the electric power consumption of the option apparatus and the printer system. Incidentally, in the embodiment 1, the relay 204 may also be constituted by another switch element such as a triac. Further, transition of the mode of the option 200 to the electric power saving mode may also be controlled so that the mode of the option 200 is changed to the electric power saving mode when the controller 202 receives a transition instruction to the electric power saving mode from the controller 109 via the signal line 401.

Thus, according to the embodiment 1, the electric power consumption of the printer system during the operation in the electric power saving mode can be reduced.

[Circuit Structure]

Figure 3:
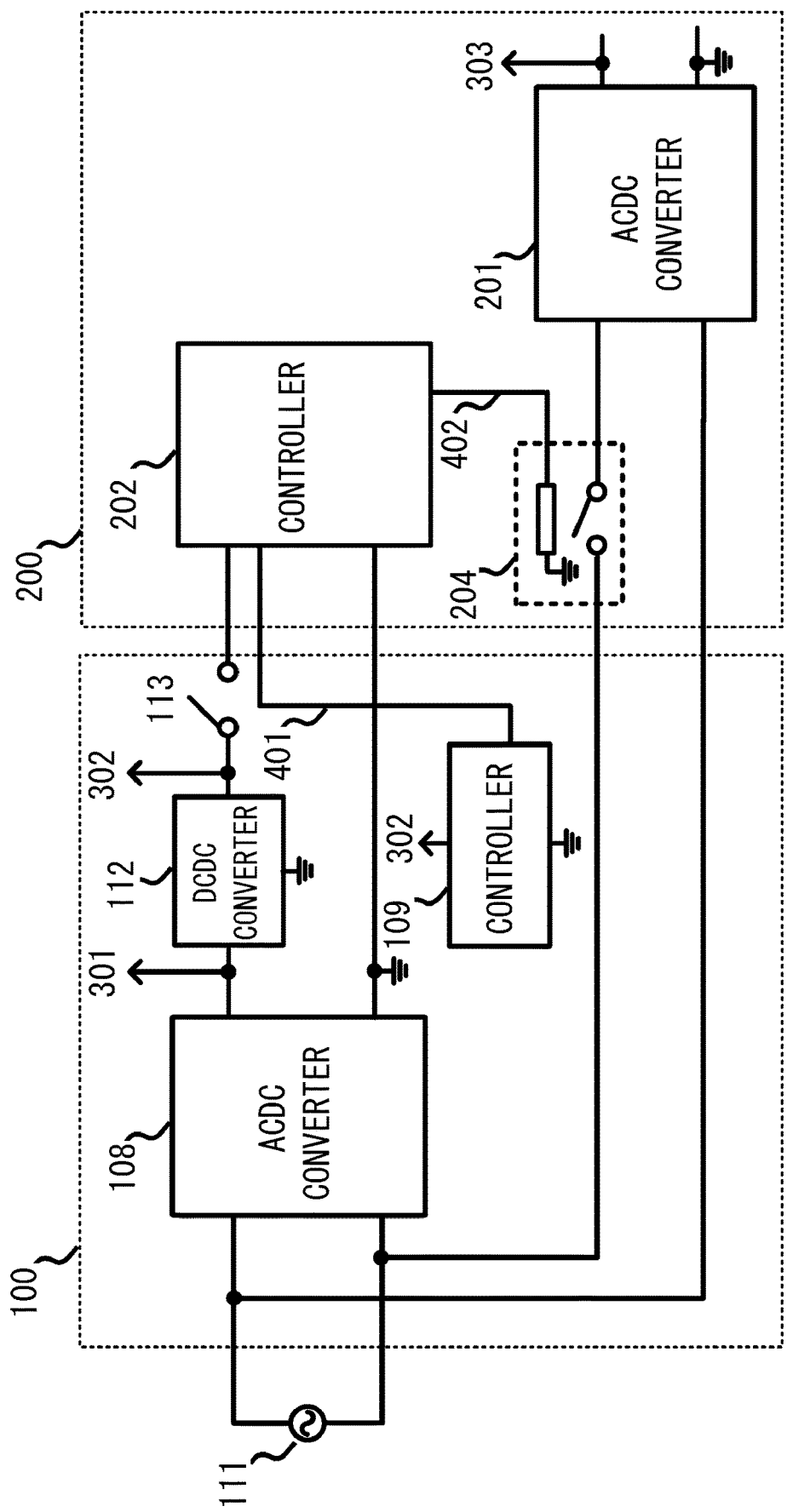
FIG. 3 is a circuit structure diagram of a printer 100 and an option 200 in the embodiment 2.

An embodiment 2 will be described. A principal portion is similar to the principal portion of the embodiment 1, and therefore, constituent elements similar to those in the embodiment 1 are represented by the same reference numerals or symbols and will be omitted from description. In this embodiment, only a portion different from the embodiment 1 will be described. In FIG. 3, a circuit structure diagram of a printer 100 and an option 200 in the embodiment 2 is shown. In the embodiment 2, the DC voltage 302 generated by the DCDC converter 112 of the printer 100 is supplied to the controller 202 of the option 200 via a load switch 113 which is a second switching means. When the controller 109 changes the mode of the printer 100 to the electric power saving mode, the controller 109 switches the state of the load switch 113 to the non-conduction state. By this, the electric power during stand-by of the controller 202 or the like as generated in the operation in the electric power saving mode in the embodiment 1 can be reduced.

Here, in the case where a power supply voltage is not supplied to the controller 202 and thus the operation of the controller 202 is at rest, a signal for putting the relay 204 in the non-conduction state is outputted to the signal line 402. Accordingly, in the case where the mode of the printer 100 is changed to the electric power saving mode and thus the load switch 113 is put in the non-conduction state, the relay 204 is also put in the non-conduction state. By this, it is possible to reduce the electric power consumption generated on the load side than the load switch 113 and the relay 204.

As described above, according to the embodiment 2, a constitution in which not only the supply of the electric power to the controller 202 during the operation in the electric power saving mode is stopped but also the relay 204 is in the non-conduction state in a state in which the controller 202 stops the operation thereof is employed. By this, the electric power consumption generated on the load side than the load switch 113 and the relay 204 can be reduced. As a result, the electric power consumption during the operation in the electric power saving mode can be further reduced.

Modified Embodiment

Figure 4:
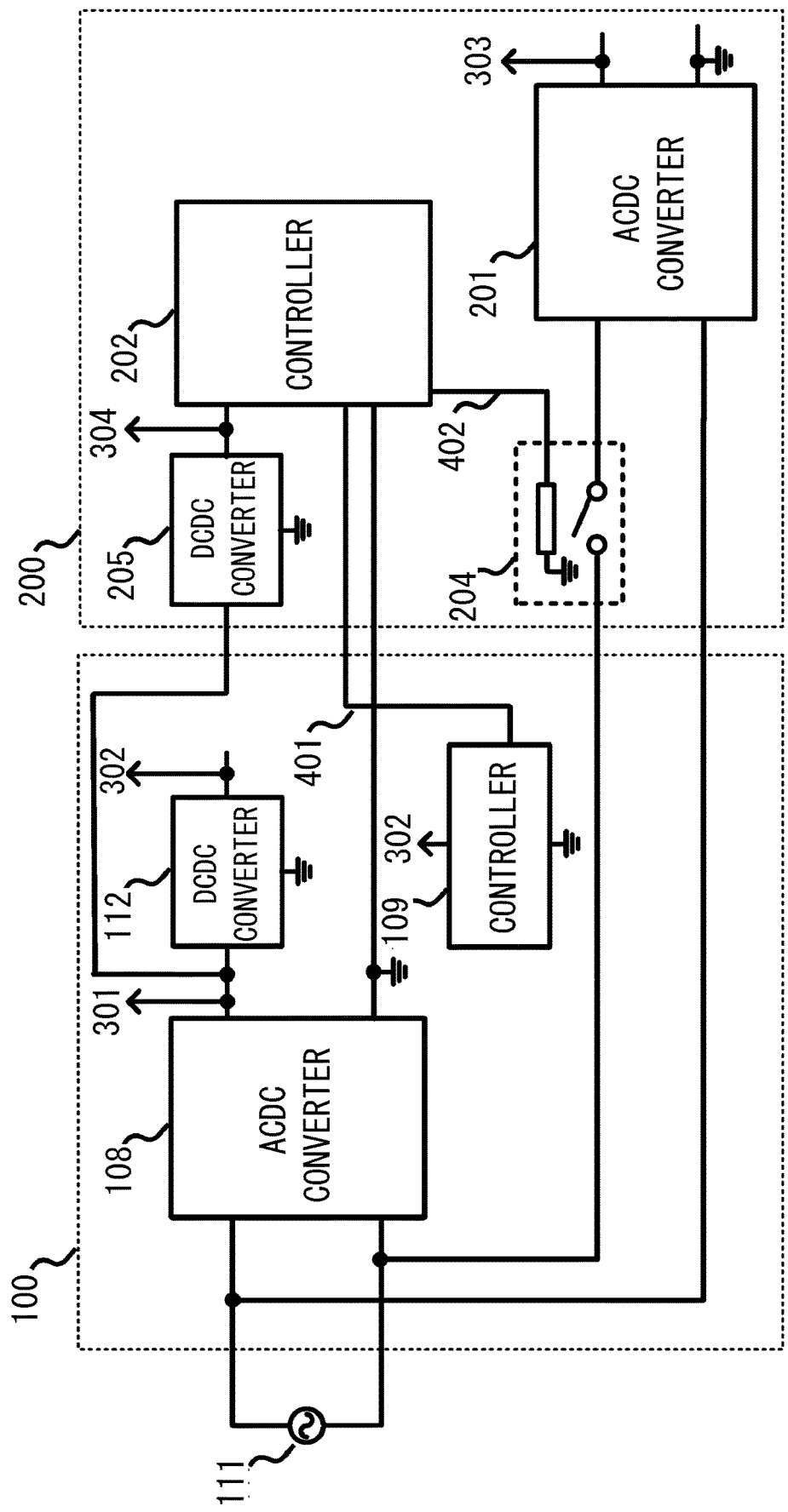
FIG. 4 is a circuit structure diagram of a printer 100 and an option 200 in a modified embodiment.

In the embodiments 1 and 2, the constitution in which the DC voltage 302 generated by the DCDC converter 112 was supplied to the controller 109 and the controller 202 was described. However, the present invention is not limited thereto. Incidentally, constituent elements similar to those in the embodiment 1 are represented by the same reference numerals or symbols and will be omitted from description. In FIG. 4, a circuit structure diagram of a printer 100 and an option 200 in a modified embodiment is shown.

As shown in FIG. 4, the option 200 includes a DCDC converter 205 which is a fourth voltage source. Thus, a constitution in which the DC voltage 301 supplied to the driving portion such as the motor of the printer 100 is converted to a fourth DC voltage 304 lower than the DC voltage 301 by the DCDC converter 205 and in which the converted DC voltage 304 is supplied to the controller 202 may also be employed. In the case of this constitution, the DCDC converter 112 is not required to supply the electric power to the controller 202, and therefore, capacity of output electric power of the DCDC converter 112 can be made small, so that a cost of the printer 100 can be reduced. Further, when the DC voltage 301 which is a voltage higher than the DC voltage 302 being a voltage for the controller and which is a voltage for the driving portion is supplied to the option 200, compared with the case where the DC voltage 302 is supplied to the option 200, a current caused to flow through electric power lines in the case where the same electric power is supplied to the option 200 can be made small. For that reason, an allowable current of the electric power lines or the number of the electric power lines can be made small, and similarly, the cost of the printer 100 can be reduced. Incidentally, between the DC voltage 301 and the DCDC converter 205, a load switch as described in the embodiment 2 may also be provided.

Incidentally, in the embodiments 1 and 2, the AC voltage inputted from the AC voltage source 111 may also be inputted to insides of the printer 100 and the option 200 in the following manner. That is, a constitution in which each of the printer 100 and the option 200 is provided with a plug connected to an outside of the apparatus and in which the AC voltage source 111 and the plug are connected to each other by an AC cable may also be employed. Alternatively, a constitution in which the AC voltage inputted from the AC voltage source 111 to the option 200 is branched inside the option 200 and in which the AC voltage is supplied from the option 200 to the printer 100 may also be employed.

Further, in the embodiments 1 and 2, the option 200 was described as the discharging option apparatus, but the present invention is not limited thereto. For example, the option 200 may also be other various option apparatuses, connected to the image forming apparatus, such as an option apparatus for performing a post-process of a plurality of sheets P, a sheet feeding option apparatus and a double-side option apparatus.

As described above, according to the embodiment 2 and the modified embodiment, the electric power consumption of the printer system during the operation in the electric power saving mode can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-074875 filed on Apr. 20, 2020, which is hereby incorporated by reference herein in its entirety.

What is claimed is:

1. A printer system comprising:
   a first apparatus including a first voltage source configured to convert an inputted AC voltage to a first DC voltage and configured to output the converted first DC voltage, and a first controller operable by a voltage based on the first DC voltage outputted from the first voltage source; and
   a second apparatus including a second voltage source configured to convert an inputted AC voltage to a second DC voltage and configured to output the converted second DC voltage, and a second controller operable by a voltage based on the first DC voltage outputted from the first voltage source,
   wherein the second apparatus includes a first switching portion configured to switch a state thereof between a connection state in which the AC voltage is supplied to the second voltage source and a non-connection state in which supply of the AC voltage to the second voltage source is cut off, and
   wherein the first switching portion is configured to switch the state thereof from the connection state to the non-connection state in a state in which electric power consumption of the printer system is reduced.

2. The printer system according to claim 1, wherein the printer system is operable in a first state in which a printing operation is executed and a second state in which the electric power consumption of the printer system is reduced than in the first state,
   wherein the state in which electric power consumption of the printer system is reduced is the second state, and
   wherein the second controller controls the first switching portion so as to switch the state of the first switching portion from the connection state to the non-connection state in response to transition from the first state to the second state.

3. The A printer system according to claim 1, wherein the first controller and the second controller are communicable with each other, and
   wherein the second controller controls the state of the switching portion from the connection state to the non-connection state in response to notification from the first controller of transition from the first state to the second state.

4. The A printer system according to claim 2, wherein the first apparatus includes a third voltage source configured to convert the first DC voltage to a third DC voltage smaller than the first DC voltage and configured to output the converted third DC voltage, and
   wherein the first controller and the second controller are operable by the third DC voltage outputted from the third voltage source.

5. A The printer system according to claim 2, wherein the first apparatus includes a third voltage source configured to convert the first DC voltage to a third DC voltage smaller than the first DC voltage and configured to output the converted third DC voltage, and includes a second switching portion configured to switch a state thereof between a connection state in which the third DC voltage is supplied to the second controller and a non-connection state in which supply of the third DC voltage to the second controller is cut off, wherein the first controller controls the second switching portion so as to switch the state of the second switching portion from the connection state to the non-connection state in response to transition from the first state to the second state, and wherein the second controller controls the first switching portion so as to switch the state of the first switching portion from the connection state to the non-connection state in response to cut-off of the supply of the third DC voltage.

6. A printer system according to claim 1, wherein the first apparatus includes a third voltage source configured to convert the first DC voltage to a third DC voltage smaller than the first DC voltage and configured to output the converted third DC voltage, wherein the second apparatus includes a fourth voltage source configured to convert the first DC voltage to a fourth DC voltage smaller than the first DC voltage and configured to output the converted fourth DC voltage, wherein the first controller is operable by the third DC voltage outputted from the third voltage source, and wherein the second controller is operable by the fourth DC voltage outputted from the fourth voltage source.

7. A The printer system according to claim 2, wherein the second controller controls the first switching portion so as to switch the state of the first switching portion from the non-connection state to the connection state in response to transition from the second state to the first state.

8. A The printer system according to claim 1, wherein the first apparatus is a printer including an image forming portion for forming an image on a recording material, and wherein the second apparatus is an option apparatus connected to the printer.

9. A printer system comprising:

a first apparatus including a first voltage source configured to convert an inputted AC voltage to a first DC voltage and configured to output the converted first DC voltage, and a first controller operable by a voltage based on the first DC voltage outputted from the first voltage source; and a second apparatus including a second voltage source configured to convert an inputted AC voltage to a second DC voltage and configured to output the converted second DC voltage, and a second controller operable by a voltage based on the first DC voltage outputted from the first voltage source, wherein the second apparatus includes a switching portion configured to switch a state thereof between a connection state in which the AC voltage is supplied to the second voltage source and a non-connection state in which supply of the AC voltage to the second voltage source is cut off, wherein the first apparatus includes a third voltage source configured to convert the first DC voltage to a third DC voltage smaller than the first DC voltage and configured to output the converted third DC voltage, wherein the second apparatus includes a fourth voltage source configured to convert the first DC voltage to a fourth DC voltage smaller than the first DC voltage and configured to output the converted fourth DC voltage, wherein the first controller is operable by the third DC voltage outputted from the third voltage source, and wherein the second controller is operable by the fourth DC voltage outputted from the fourth voltage source.

\* \* \* \* \*